Sept. 11, 1962　　　　F. W. FORK　　　　3,053,014
ELECTRICAL FITTINGS BASE CUP
Filed Oct. 13, 1960
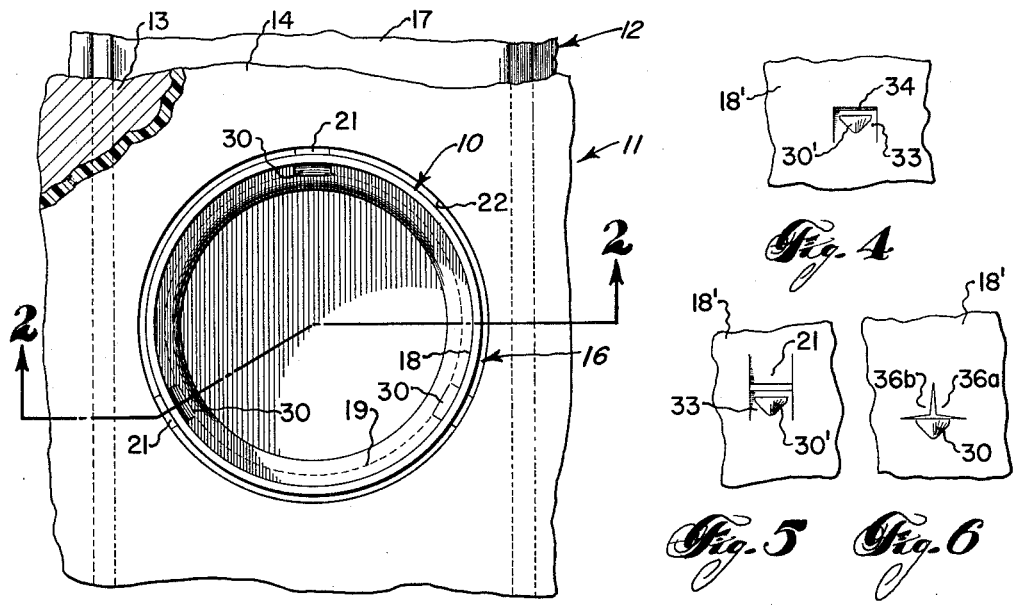
Fig. 1  Fig. 4  Fig. 5  Fig. 6
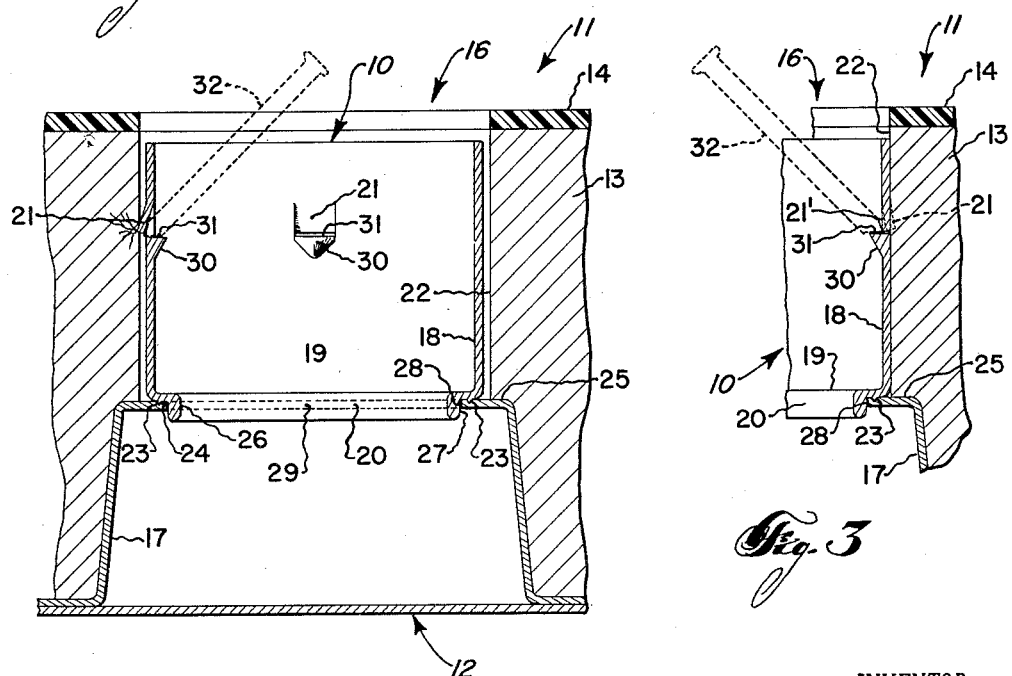
Fig. 2  Fig. 3
INVENTOR.
FRANK W. FORK
BY 
ATTORNEY nited States Patent Office 3,053,014
Patented Sept. 11, 1962

3,053,014
ELECTRICAL FITTINGS BASE CUP
Frank W. Fork, Pittsburgh, Pa., assignor to
H. H. Robertson Company
Filed Oct. 13, 1960, Ser. No. 62,441
4 Claims. (Cl. 50—127)

This invention relates to an electrical fittings base cup for use in combination with an electrical raceway disposed beneath a floor or wall of a building. More particularly this invention relates to an electrical fittings base cup having concrete, lath or plaster engaging means.

The primary object of this invention is to provide a base cup having an integral portion which is used as a securing means thus eliminating the need of auxiliary fasteners.

Another object of this invention is to provide a base cup having a wider base opening which accommodates larger electrical cables without severe cable stresses.

Still another object of this invention is to provide a base cup which electrically grounds itself while the base cup is secured in place.

A further object of this invention is to provide a base cup that is quickly and easily installed.

These and other objects and advantages of the present invention will become apparent from the following detailed description by reference to the accompanying drawings in which:

FIGURE 1 is a fragmentary plan view of a building floor having metal cellular flooring illustrating the installation of the preferred embodiment of the present electrical fitting base cup;

FIGURE 2 is a cross-sectional view taken along the line 2—2 of FIGURE 1;

FIGURE 3 is a fragmentary cross-sectional view similar to FIGURE 2 illustrating the installation of the present base cup in close fitting cavity; and FIGURES 4, 5 and 6 are front elevation views illustrating alternative embodiments of securing means.

Illustrated in FIGURES 1 and 2 is a base cup 10 of the present invention installed beneath the level of an interior flat surface of a building, shown here as building floor 11. The floor 11 comprises a metal cellular flooring 12, a layer of concrete 13 and a decorative floor covering 14. A cell 17 of the metal cellular flooring 12 serves as an electrical raceway. The floor 11 further includes a cavity 16 within which rests the base cup 10. The cavity 16 in this instance has a diameter that is larger than the outer diameter of the base cup 10.

The base cup 10 has cup side walls 18 and a bottom wall 19 which rests on the cell 17. The bottom wall 19 has a cable passageway 20 which communicates with the interior of the cell 17. The cup side walls 18 have securing means which comprise a plurality of bendable tabs 21 which engage side walls 22 of the cavity 16.

The bottom wall 19 also includes grounding elements, shown here as conical spikes 23, located on the lower face 24. The spikes 23 engage the outer surface 25 of the cell 17 to provide for electrical grounding of the base cup 10. The cable passageway 20 is provided with a peripheral downwardly depending lip 27 extending through a cell aperture 28 into the interior of the cell 17. The lip 27 has a smooth inner surface 29 which prevents abrasion of electrical cables passing through the cable passageway.

The tabs 21 of the preferred embodiment are substantially U-shaped and have an upright U orientation. When tabs 21 are bent outwardly to engage the side walls 22 there results a downwardly directed force which maintains the base cup 10 in contact with the cell 17 and thereby in a fixed position within the cavity 16. The cup side walls 18 further include an inwardly projecting lug 30 positioned beneath each of the tabs 21. The lugs 30 provide an extended surface 31 upon which a suitable tool such as chisel 32 shown in phantom outline rests while the tabs 21 are bent. It should be apparent that when the head of the chisel 32 is struck, the resulting force is directed partly to bending the tab 21 and partly to urging the base cup 10 in a downward direction. Thus the spikes 23 are forced into engagement with the outer surface 25 to provide electrical grounding of the base cup 10 with the cell 17.

When the outer diameter of the base cup 10 is smaller than the inner diameter of the cavity 16 as illustrated in FIGURES 1 and 2, the lip 26 serves a specific purpose. The lip 26 is shown with its outer rim 27 engaging the cell aperture 28. This engagement holds the base cup 10 in a fixed position with respect to the cavity 16 while the tabs 21 are bent into engagement with the side walls 22. It should be apparent that without this engagement the base cup 10 would slide horizontally.

It should be noted that the tabs 21 are formed solely from a portion of the cup side walls 18 for example by punching operations or when casting the base cup 10. With this construction the need of auxiliary fasteners to secure the base cup 10 is eliminated.

Heretofore electrical base cups have been fastened in position by means of screws extended through the bottom wall of the base cup into a contiguous subjacent metal raceway for electrical cables. The inclusion of such screws limited the available diameter of the cable aperture in the bottom wall of the base cup. According to the present invention, the base cup 10 is secured at points which are not on the bottom wall. Thus a larger cable aperture may be provided without increasing the size of the cavity in the floor. Consequently the cable passageway 20 can handle larger sized cables or its increased size can be used to reduce the bending stresses on large cables by increasing the allowable bending radius.

The installation of base cup 10 is accomplished as follows. The cavity 16 is first cut in the floor 11 through the concrete layer 13. The cell aperture 28 is then cut to the proper size. The base cup 10 is inserted into the cavity 16 with lip 27 extending through the aperture 28. A suitable tool, such as the chisel-like tool 32 illustrated in phantom outline in FIGURE 2, is then used to bend the tabs 21 into engagement with the side walls 22 of the cavity 16. The base cup 10 is now secured within the cavity 16 and electrically grounded to the cell 17.

Referring now to FIGURE 3 the base cup 10 is illustrated as installed in a cavity whose diameter is slightly larger than the outer diameter of the base cup 10. The tab 21, shown in phantom outline, engages the concrete side wall 22 of the cavity 16. The tab designated by the numeral 21' illustrates its position when the base cup 10 is manufactured, i.e., normally flush with the cup side wall 18.

The method of securing the base cup 10 in this instance is identical with that described in connection with FIGURES 1 and 2.

The base cup 10 may be made of metals such as cast iron or steel. The base cup 10 has been illustrated as being circular but it should be understood that the base cup 10 instead could have any shape without affecting the efficiency of the tabs 21.

Attention is now directed to FIGURES 4–6 inclusive wherein alternative configurations of the tabs 21 are illustrated. Each of these alternative configurations is formed solely from a portion of the cup side walls herein designated by the numeral 18'.

Illustrated in FIGURE 4 is a tab 33 which is similar to the tab 21 of the preferred embodiment. The tab 33 differs in that it has an inverted U orientation, whereas in the preferred embodiment the tab 21 has an upright U orientation. Further the tab 33 includes an inwardly projecting lug 30′ adjacent its upper edge 34. The lug 30′ is similar to lug 30 of the preferred embodiment. The lug 30′ differs in that it is a part of the tab 30′, whereas the lug 30 of the preferred embodiment is part of the cup side walls 18. The lug 30′ provides a surface upon which a suitable tab bending tool may be placed. Thus lug 30′ serves the purpose of directing part of the tab bending force to forcing the base cup 10 in a downward direction.

Another alternative configuration is illustrated in FIGURE 5 whereas two tabs are provided corresponding with the tab 21 of the preferred embodiment and the tab 33 of FIGURE 3. This configuration provides additional engagement with the cavity 16.

The alternative configuration illustrated in FIGURE 6 comprises tabs 36a and 36b. The lug 30 of this alternative configuration is identical with the lug 30 of the preferred embodiment in that it is a part of the side walls 18′. The tabs 36a, 36b are formed by making an inverted T cut in the cup side walls 18′ which defines the two triangular tabs 36a, 36b. When the tabs 36a, 36b are bent outwardly they engage the side walls of the floor cavity and provide a downwardly directed force which secures the base cup 10 within the cavity 16.

From the foregoing description it will be apparent that the present invention provides a base cup having integral securing means which eliminate the need for separate independent fasteners. The present invention also provides a base cup with an enlarged cable passageway which decreases the bending stresses on electrical cables and which can handle larger size electrical cables. The present invention further provides a base cup that electrically grounds itself while being installed thus further reducing the time involved in installation.

Various electrical fittings, such as low tension or high tension floor outlets, may be secured to the present base cup by providing suitable connecting means on the cup side walls 18.

According to the provisions of the patent statutes, I have explained the principle, preferred embodiment and mode of operation of my invention and have illustrated and described what I now consider to represent its best embodiment. However, I desire to have it understood that within the scope of the appended claims, the invention may be practiced otherwise than as specifically illustrated and described.

I claim:

1. A base cup in combination with an electrical raceway disposed beneath an interior flat surface of a building including cup side walls and a bottom wall, said base cup being disposed within a cavity in the said flat surface, said bottom wall having a cable passageway communicating with the interior of the said electrical raceway, said cup side walls including a plurality of bendable tabs formed solely from a portion of the said cup side walls, said bendable tabs being normally flush with the said cup side walls, at least one of said bendable tabs being bent outwardly into penetrating engagement with the side walls of the said cavity thereby securing the said base cup in a fixed position within the said cavity.

2. The base cup of claim 1 wherein the rim of said cable passageway comprises a downwardly depending lip, said electrical raceway having a raceway aperture through which the said lip extends, said cavity having a larger horizontal cross-section than said base cup, said lip peripherally engaging the rim of the said raceway aperture whereby said cup side walls are maintained in spaced relationship with said side walls of said cavity while said tabs are bent.

3. A base cup in combination with an electrical raceway disposed beneath an interior flat surface of a building including cup side walls and a bottom wall, said base cup being disposed within a cavity in the said flat surface, said bottom wall having a cable passageway communicating with the interior of the said electrical raceway, said cup side walls including a plurality of bendable substantially U-shaped tabs, said bendable tabs being normally flush with the said cup side walls, said tabs being formed solely from a portion of the said cup side walls, at least one of said tabs being bent upwardly and outwardly in penetrating engagement with the side walls of the said cavity whereby the said base cup is forced downwardly into engagement with the said electrical raceway.

4. A base cup in combination with an electrical raceway disposed beneath a floor of a building including cup side walls and a bottom wall, said base cup being disposed within a cavity in the said floor, said bottom wall having a cable passageway communicating with the interior of the said electrical raceway, and grounding elements, said cup side walls including a plurality of substantially U-shaped tabs formed solely from a portion of the said cup side walls, said bendable tabs being normally flush with the said cup side walls, said U-shaped tabs being bendable outwardly to engage the side walls of the said cavity and to secure the said base cup in fixed relationship to the said electrical raceway whereby the said grounding elements engage the said electrical raceway, said base cup being thereby maintained in electrically grounded relation with the said electrical raceway.

References Cited in the file of this patent

UNITED STATES PATENTS

| | | |
|---|---|---|
| 1,718,878 | Raguette | June 25, 1929 |
| 2,657,250 | Wiesmann | Oct. 27, 1953 |
| 2,809,763 | Clark | Oct. 15, 1957 |